April 2, 1957    R. F. SMITH    2,787,024
METHOD OF MAKING PLASTIC COVERED GOLF BALLS
Filed June 11, 1953

INVENTOR.
Robert F. Smith
BY Frease & Bishop
ATTORNEYS

United States Patent Office 2,787,024
Patented Apr. 2, 1957

2,787,024

METHOD OF MAKING PLASTIC COVERED GOLF BALLS

Robert F. Smith, Elyria, Ohio, assignor to The Worthington Ball Company, Elyria, Ohio, a corporation of Ohio Application June 11, 1953, Serial No. 360,973

5 Claims. (Cl. 18—59)

The invention relates generally to golf balls and more particularly to a method of precision molding golf balls with covers of polyethylene plastic material.

In the prior manufacture of golf balls, the covers ordinarily have been formed of balata, or gutta percha. In such prior manufacture a slug of desired weight is cut from a body or bar of balata or gutta percha and heated in hot water to prevent oxidation, after which the thus heated slug is formed in a cold compression molding press generally to semi-spherical cup-shape and preferably with an enlarged button in the outer central bottom wall surface of the cup-shape. Such generally semi-spherical blanks ordinarily have a thinner wall thickness in the side walls thereof adjacent the open end of the cut than in the bottom wall thereof and a substantial flash is produced in the upper open end of the cup during the press forming of the hot water heated slug. This flash normally is not removed.

Although some attempts have been made to maintain accurate concentricity of balata or gutta percha cover blanks formed in the manner described, nevertheless there are substantial variations in the shapes thereof from piece to piece and likewise there are some variations in the thickness of the blank at any section taken on a plane normal to an axis through the center of the cup. In other words, eccentricity in the wall thickness of the cover blank occurs. Such eccentricity may result in a final, though small, eccentricity of cover thickness in a golf ball made by inserting a wound golf ball core in two such semi-spherical blanks and placing the same in a die to mold the cover blanks and form the completed golf ball.

Furthermore, the surfaces of such balata or gutta percha cover blanks are not smooth, uniform or even. Surface porosity or recesses or unevenness are always present both in the interior and exterior surfaces of cover blanks so formed which prevent the maintenance of absolutely uniform molding conditions in the subsequent molding of a golf ball using such cover blanks. Such surface porosity probably occurs from small droplets of the water in which the slug is heated adhering to the surface of the slug, which water droplets are trapped in the mold during the cold compression forming of the blanks causing the surface indentations.

Such surface porosity on balata or gutta percha golf ball cover blanks may be minimized by air heating the slug prior to molding rather than by heating in hot water; but air heating may cause oxidation having a detrimental effect upon the resultant ball.

I have discovered that these and other difficulties in the manufacture of golf balls can be avoided or eliminated by molding golf ball covers from blanks molded of polyethylene plastic material. Such material has physical properties closely approaching those of balata or gutta percha in respect to resiliency and toughness. Thus polyethylene plastic material has a tensile strength of 1800 pounds with 550% elongation. However, it will not oxidize under normal conditions, or varying conditions of weather and sunlight, and it retains its predetermined physical characteristics indefinitely and remains unchanged with age.

Normally it is not affected by chemicals, such as may be applied to turf on golf links and it is unaffected by humidity changes, or fresh or salt water, and it does not harden or crack but retains its resiliency and toughness for a long period of time.

Moreover, such material may have color such as white coloring material incorporated therein and throughout, while retaining a specific gravity of a level, that is about 0.94 at 20° C. which is desirable from other standpoints in forming a golf ball cover therefrom.

Furthermore, I have discovered that polyethylene plastic material may be molded into extremely accurate shaped and sized thin walled cup-shaped blanks with absolutely uniform wall thickness at any section taken on a plane lying normal to the axis of the cup-shaped or semi-spherical blank; and such material also can be molded to have extremely smooth and uniform interior and exterior surfaces, free of the surface porosity or indentations which are characteristic of the described prior art balata or gutta percha golf ball cover blanks.

I further have discovered that when a cup-shaped golf ball cover blank is molded of polyethylene plastic with the uniformity described as to wall thickness and surface finish, golf balls may be molded subsequently from such cover blanks without eccentricity of weight distribution in the outer regions of the ball so that each ball is perfectly balanced and any number of balls constructed in the same manner are uniform and identical from ball to ball. This enables a player to attain and maintain greater control and accuracy throughout a game where it is necessary to use a series of balls during the course of a game.

The use of polyethylene plastic as a cover material for a golf ball also enables painting of the ball to be eliminated because the necessary white coloring material can be added to the plastic. It has always been necessary to paint golf balls having a balata or gutta percha cover with two or three coats of paint. In painting, it is impossible to obtain absolute uniformity in paint thickness over the entire outer surface of a golf ball including the dimple depression; and variations in paint thickness, particularly in the dimples where variations always occur, can result in weight eccentricity in an otherwise perfectly balanced ball, which reduces the accuracy of the ball in flight and in putting.

Also, the elimination of paint from the surface of a golf ball enables uniformity in dimple shape with sharp corners to be maintained, so that the dimples retain their uniform wind resistance thereby keeping the ball from skidding or dipping in flight.

When a golf ball is painted, in addition to the non-uniformity of paint thickness, particularly in the dimples, the intersection of the dimple surfaces with the outer spherical ball surface is not sharp but rounded, which reduces the uniformity of wind resistance of the ball in flight.

Accordingly, it is an object of the present invention to provide a new molding procedure for molding polyethylene plastic golf ball cover material on a wound core to produce a perfectly balanced golf ball.

Also, it is an object of the present invention to provide a new golf ball manufacturing procedure involving first the molding of polyethylene plastic golf ball cover blanks free of eccentricity having absolutely uniform wall thickness at any section taken on a plane normal to the axis of the cup-shaped blank; and having a wall thickness varying in a predetermined degree from the free edge of the cup-shaped blank to the bottom thereof, so that the blank contour at any section taken in a plane passing through the axis of the cup-shape will be the same as the contour at any section taken in any other similar plane; and the then molding of the plastic cover blanks around a wound core.

Moreover, it is an object of the present invention to utilize a new polyethylene plastic, cup-shaped, generally semispherical cover blank for the manufacture of golf balls, having extremely smooth external and internal surfaces, free of surface porosity or indentations, thereby eliminating the possibility of cover thickness eccentricity in a golf ball molded from a wound core and two similar such cup-shaped blanks.

Also, it is an object of the present invention to utilize a new molded white colored plastic golf ball cover blank in subsequent remolding for the manufacture of golf balls whereby cover painting is eliminated thereby eliminating the possibility of weight eccentricity in the outer regions of the molded ball.

In addition, it is an object of the present invention to utilize a new precision molded golf ball cover blank to precision mold a golf ball with precision formed dimples and spherical outer surfaces with sharp intersecting corners so as to maintain in the finished ball uniformity in dimple wind resistance in flight.

Moreover, it is an object of the present invention to provide a new method of making golf balls with plastic covers whereby extreme accuracy in size, weight, surface and concentricity of the ball is obtained, giving the highest degree of uniformity in flight characteristics, controllability and performance for any individual ball or for all balls in a group intended to be similar or the same.

Also, it is an object of the present invention to provide a dual molding procedure for molding polyethylene plastic material to form the cover of a golf ball in which accurately molded cover blanks generally semi-spherical in shape are first molded at high temperature and pressure from polyethylene plastic material mixed with a desired amount of coloring material, and the cover blanks are then remolded at a lower temperature and under relatively high pressure around a wound golf ball core to form the finished golf ball.

Finally, it is an object of the present invention to provide a new golf ball manufacturing procedure incorporating the foregoing desiderata, which solves problems and avoids difficulties that have existed in the art, and which attains the foregoing advantages and results in an effective, simple and inexpensive manner.

These and other objects and advantages apparent to those skilled in the art from the following description and claims may be obtained, the stated results achieved, and the described difficulties overcome, by the methods, steps and procedures which comprise the present invention, the nature of which is set forth in the following general statement, a preferred embodiment of which— illustrative of the best mode in which applicant has contemplated applying the principles—is set forth in the following description and drawing, and which are particularly and distinctly pointed out and set forth in the appended claims forming part hereof.

The nature of the discoveries and improvements in a method of dual molding for manufacturing golf balls with polyethylene plastic cover material may be stated in general terms as including the steps of precision molding cup-shaped blanks of polyethylene plastic material under high heat and pressure generally to semi-spherical shape with a preferably spherical outer surface provided with a projecting dimple or button centrally of the cup bottom wall and having a curved inner surface such that the side and bottom walls have increasing thickness from the open cup edge thereof to the bottom wall with a greater rate of change of thickness as the side walls merge spherically into the bottom wall; enclosing a wound golf ball core within two such precision molded blanks; and remolding the same at high pressure and at a lower temperature to form the completed golf ball.

By way of example, preferred steps in the procedure of manufacturing polyethylene plastic covered golf balls in accordance with the improved method are illustrated in the accompanying drawing forming part hereof wherein.

Similar numerals refer to similar parts throughout the various figures of the drawing.

Figure 1:
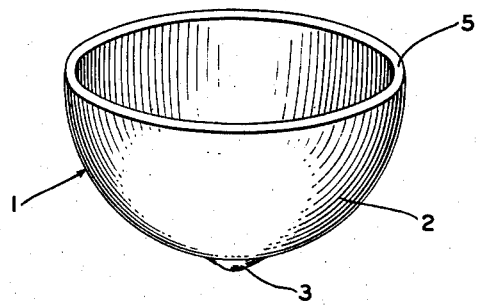
Figure 1 is a perspective view of a precision molded polyethylene plastic cover blank.

In accordance with the present invention, a cover blank generally indicated at 1 in Fig. 1 is molded to generally semispherical shape with a spherical outer surface 2 and preferably a projecting button or nipple 3 at the bottom of the cup-shape and with an inner curved surface 4 (Fig. 2) formed with respect to the outer surface 2 such that the side walls of the blank have increasing thickness from the open edge 5 to the thicker bottom wall portion 6 beneath the nipple 3.

The cover blank 1, when so formed, shaped and contoured by precision molding in the manner shown and to be described, has a substantial amount of the cover material located in the bottom wall portion 6 and projecting nipple portion 7. Normally, the outer diameter of the upper open end 5 of the cover blank 1 approximates the outer diameter of the outer spherical surface of the golf ball to be formed, which, under established official golf rules, must not be less than 1.68".

Cover blanks 1 may be accurately precision molded from polyethylene plastic material which is usually supplied in crystal form. The polyethylene plastic material may be mixed and ground with the necessary amount of white coloring material and any compounding material if used, and in accordance with the invention, is placed in a cylinder wherein it is heated to 475° F. to 550° F. until liquid and is then injected into a multiple cavity mold at 10,000 pounds per square inch pressure, the mold being heated to a temperature of from 60° to 100° F.

The injected hot liquid plastic material immediately sets in the mold cavities within a matter of a few seconds and the precision molded blanks 1 may then be removed from the mold cavities by separation of the mold parts. The cover blanks 1 thus formed have extreme uniformity in wall thickness and concentricity throughout so that piece by piece the cover blanks 1 are all the same.

Figure 2:
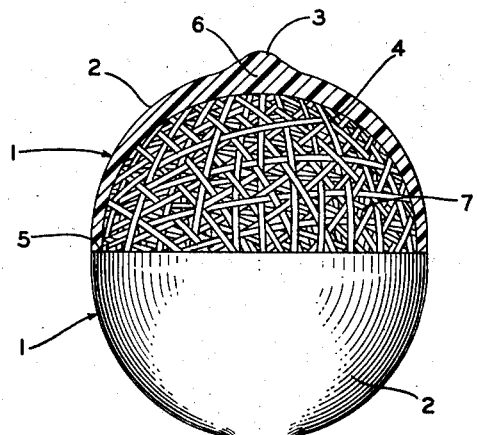
Fig. 2 is a cross-section illustrating a wound golf ball core enclosed within two blanks such as illustrated in Fig. 1.
Figure 3:
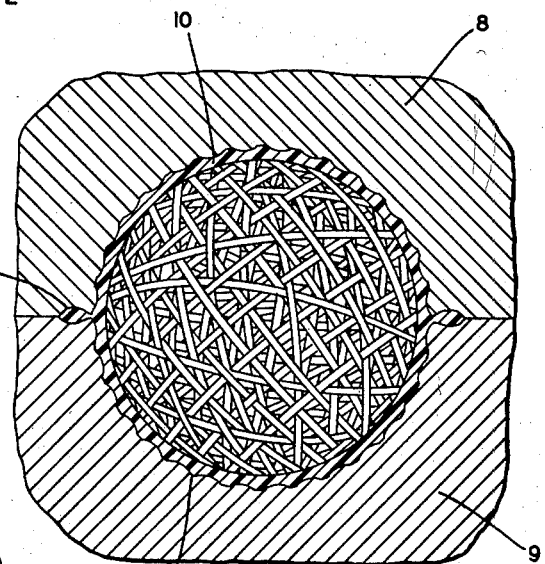
Fig. 3 is a fragmentary somewhat diagrammatic view illustrating the parts shown in Fig. 2 molded to form a golf ball.
Figure 4:
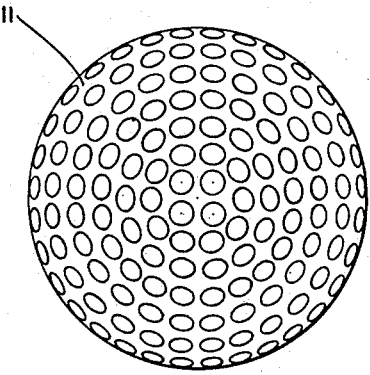
Fig. 4 is a view of a completed golf ball.

Two such cover blanks 1 may then be assembled with a wound golf ball core 7 as indicated in Fig. 2 and placed in a cavity of a multiple cavity golf ball mold including an upper die 8 and a lower die 9 as shown in Fig. 3. Each cavity of the dies 8 and 9 is formed accurately to spherical contour with projections complementary to the dimples to be formed in the surface of the completed golf ball.

In accordance with the invention, the upper and lower dies 8 and 9 of the mold are preheated to about 305° to 310° F. uniformly throughout. A series of assembled wound core and cover blanks 7 and 1 as shown in Fig. 2 are then charged into the cavities in the lower die 9 of a multiple cavity mold, and the mold is closed while maintaining the 305° to 310° F. temperature with a ram pressure of approximately 300 pounds.

Such pressure and temperature are maintained for approximately two and three-quarters to three and one-half minutes to heat the polyethylene plastic cover material under low pressure to the indicated temperature. When the plastic cover material has been so heated to such temperature, the ram pressure is increased to about 1800 pounds and the mold heating medium, usually steam, is cut off and 38° water pumped through the heating or cooling passages of the mold dies to lower the mold temperature as rapidly as possible.

The plastic material so molded under the high 1800 pound ram pressure is forced by the pressure to flow around the wound core from the thicker cup bottom wall portions 6 to the sides thereof to bond together at the abutting open edges 5 of the two cover blanks 1 and to the rubber threads of the thread wound core to form a golf ball with a uniform cover thickness as shown in Fig. 3 wherein the completed bonded cover is indicated at 10.

The polyethylene plastic material on cooling of the dies 8 and 9 sets up at about 150° F. and as the mold is continued to be cooled, sufficient shrinkage of the plastic material occurs that the upper and lower dies 8 and 9 may be separated and the precision molded golf balls 11 removed therefrom when the mold temperature is lowered to within 100° to 125° F. A molding cycle may be completed from charging to again charging in about 21 minutes.

It has been believed that polyethylene plastic material will not flow freely enough, short of the normal 450° F. lower limit injection molding temperature, to mold the same to precision shape. However, in accordance with the present invention I have discovered that polyethylene plastic material can be subjected to the dual molding treatment described and if once formed at high pressure and high temperature under injection molding procedure to precision shaped blanks 1, such blanks when again heated to the lower 305° to 310° F. temperature will flow freely enough under pressure to bond together and to the thread windings to provide the uniform cover thickness and a precision shaped golf ball 11.

During the golf ball molding step illustrated in Fig. 3, a flash 12 of excess plastic material is formed which may be removed from the molded golf balls after the balls have been removed from the dies 8 and 9. I have discovered further that this flash material may be ground and reused as a part of the initial polyethylene plastic material charged to the injection molds for molding the cover blanks 1 provided that manufacturing conditions are maintained such that the flash material 12 does not become dirty in processing.

Accordingly, in carrying out the procedure of the present invention, there is little if any loss of raw material and thereby the cost of providing golf balls with polyethylene plastic covers is reduced to a minimum.

Furthermore, in accordance with the present invention, since the plastic cover blanks are molded with a degree of accuracy impossible of attainment under present practice with gutta percha or balata, it is possible to mold the final golf ball end product from such accurate cover blanks telescoped about a rubber thread wound core to a greater degree of accuracy than has heretofore been possible in the manufacture of golf balls.

Moreover, I have discovered that in the dual or repeated molding of polyethylene plastic material at different pressures and temperatures, there is no apparent decrease in the physical properties of the remolded material over those characterizing the initially molded material.

This latter discovery is important in that it establishes that polyethylene plastic material can be subjected to repeated molding for the manufacture of a product composed wholly of polyethylene plastic material or polyethylene plastic material as a component, where the shape, contour or other characteristic of the final product (composed either solely of polyethylene plastic material or such material as a component part) prevents the end product from being formed in a single molding operation.

The discovery is of further significance in that it establishes that polyethylene plastic material can be used as a component part of an article to be manufactured whereas in the other component or components of the article may be formed of such material or materials as not to be able to withstand or to be subjected to the high temperature involved (above 475° F.) in injection molding polyethylene plastic, but is capable of withstanding or being subjected to a lower molding temperature, say of up to 310° F., which is all that is required in the second molding step or stage of the dual molding procedure of the present invention.

In the foregoing description, reference is made to polyethylene plastic material from which golf balls have been made successfully in the manner described. Such polyethylene plastic material is sometimes referred to as polyethylene resin, and polyethylenes are otherwise referred to as ethylene polymers. Polyethylene is defined in "Rubber Redbook," published by "Rubber Age," as a generic name applied to a series of polymers of ethylene of various average molecular weights featuring low electrical losses together with high resistance to moisture and chemicals and toughness over a wide range of temperatures.

Golf balls have also been successfully made in accordance with the dual molding procedure of the present invention of polyethylene plastic with which other materials have been compounded. For example, golf balls have been made with covers of polyethylene resin, with which 10% to 16%, by weight, of high styrene butadiene resin has been compounded. In other examples, 5% to 10% synthetic butyl rubber, by weight, has been compounded with polyethylene resin in the manufacture of golf balls in accordance with the present invention.

As another example, 10% gutta percha and 5% zinc oxide, by weight, have been compounded with polyethylene resin in the manufacture of golf balls in accordance with the present invention.

As another example, 10% high styrene butadiene resin, 10% synthetic butyl rubber and 5% zinc oxide, by weight, have been compounded with polyethylene to make golf balls in accordance with the present invention.

The golf balls made in accordance with all of the examples described herein with covers formed of polyethylene or polyethylene compounded with high styrene butadiene resin, or synthetic butyl rubber, or gutta percha, either alone or in the combinations indicated, have aproximately the same characteristics as to denseness, toughness, strength, surface smoothness, and ability to be formed accurately to precision shape.

When the term "polyethylene plastic" is used herein and in the claims, such term is intended to include polyethylene resin and polyethylene with one or more of high styrene butadiene resin, synthetic butyl rubber and gutta percha compounded therewith.

Accordingly, the present invention provides a new molding procedure for the manufacture of golf balls with polyethylene plastic material covers; provides a new procedure involving dual or repeated molding of the plastic material at different pressures and temperatures; provides a procedure in which excess flash material may be reground and used as a raw material; and provides a procedure by which golf balls may be manufactured with polyethylene plastic covers to extremely accurate size, spherical shape and uniform cover thickness.

In the foregoing description, certain terms have been used for brevity, clearness and understanding; but no unnecessary limitations are to be implied therefrom beyond the requirements of the prior art, because such terms are used for descriptive purposes herein and not for the purpose of limitation, and are intended to be broadly construed.

Having now described the features, discoveries and principles of the invention, the manufacture of a golf ball in accordance with the preferred steps to be used, and the advantageous, new and useful results obtained thereby; the new and useful steps, procedures, and methods, and reasonable mechanical equivalents thereof obvious to those skilled in the art, are set forth in the appended claims.

I claim:

1. The method of making golf balls with polyethylene plastic covers including the steps of heating polyethylene plastic material to about 475° F. and injection molding the same under high pressure to form generally semispherical cover blanks, telescoping two such cover blanks over a wound golf ball core, placing said wound core with cover blanks telescoped thereover in a die cavity and heating the same to from 305° to 310° F. under about 300 pounds pressure for from 2¾ to 3½ minutes, then increasing the pressure to about 1800 pounds and reducing the mold temperature to set the molded plastic cover at about 150° F., and then removing the molded golf ball from the mold when the mold temperature has been reduced to about 100° to 125° F.

2. The method of making golf balls with dual molded plastic covers including the steps of heating polyethylene plastic material to above 475° F. and injection molding the same under high pressure to form generally semispherical cover blanks, telescoping two such cover blanks over a wound golf ball core, placing said wound core with cover blanks telescoped thereover in a die cavity and remolding the same at a lower temperature not in excess of 310° F. for about three minutes at low pressure, then increasing the pressure and reducing the mold temperature to set the remolded plastic cover, and then removing the molded golf ball from the mold after the mold temperature has been reduced to below setting temperature.

3. The method as set forth in claim 2 in which the polyethylene plastic material subjected to dual molding has compounded therewith material selected from the group consisting of high styrene butadiene resin, synthetic butyl rubber, and gutta percha.

4. The method of making an article of manufacture having polyethylene plastic material as one of several components thereof including the steps of heating polyethylene plastic material to above 475° F. and injection molding the same under high pressure to selected blank shape, assembling said blank shape with another component of the article to be manufactured, placing said assembled components in a die cavity and remolding the same at a lower temperature not in excess of 310° F. for from 2¾ to 3½ minutes at low pressure, and then increasing the pressure and reducing the mold temperature to set the remolded plastic material.

5. The method of making an article of manufacture of polyethylene plastic material including the steps of heating polyethylene plastic material to above 475° F. and injection molding the same under high pressure to selected blank shape, then placing said blank shape in a die cavity and remolding the same at a lower temperature of from 305° F. to 310° F. for from 2¾ to 3½ minutes at low pressure, and then increasing the pressure and reducing the mold temperature to set the remolded plastic material.

References Cited in the file of this patent

UNITED STATES PATENTS

| | | |
|---|---|---|
| 2,120,567 | Merrill | June 14, 1938 |
| 2,188,285 | Merrill | Jan. 23, 1940 |
| 2,261,760 | Habgood | Nov. 4, 1941 |
| 2,324,974 | Greenup | July 20, 1943 |
| 2,497,226 | McNeill | Feb. 14, 1950 |
| 2,624,916 | Persak | Jan. 13, 1953 |
| 2,722,264 | Smith | Nov. 1, 1955 |